United States Patent [19]

Sivertsen

[11] 4,351,128
[45] Sep. 28, 1982

[54] FISH LINE BOBBER/SINKER

[75] Inventor: John W. Sivertsen, Minneapolis, Minn.

[73] Assignee: Carlton F. Peterson, Rush City, Minn. ; a part interest

[21] Appl. No.: 233,914

[22] Filed: Feb. 12, 1981

[51] Int. Cl.³ .............................................. A01K 95/00
[52] U.S. Cl. .................................. 43/44.91; 43/44.95
[58] Field of Search ................... 43/44.89, 44.9, 44.91, 43/44.92, 44.93, 44.95

[56] References Cited

U.S. PATENT DOCUMENTS

| | | | |
|---|---|---|---|
| 522,167 | 6/1864 | Rawlings | 43/44.9 |
| 2,481,346 | 9/1949 | Rigby | 43/44.95 |
| 2,570,293 | 10/1951 | Vadnais | 43/44.91 |
| 2,579,713 | 12/1951 | Tolle | 43/44.91 |
| 2,741,067 | 4/1956 | Cox | 43/44.9 |
| 2,849,827 | 9/1958 | Gardiner | 43/44.9 |
| 3,096,599 | 7/1963 | Baron | 43/44.9 |
| 3,293,792 | 12/1966 | Bittaker | 43/44.89 |
| 3,808,728 | 5/1974 | Ratte | 43/44.91 |
| 3,867,783 | 2/1975 | Simpson | 43/44.91 |
| 3,955,305 | 5/1976 | Roberts | 43/44.91 |
| 4,235,037 | 11/1980 | Sivertson | 43/44.91 |

Primary Examiner—Stephen G. Kunin
Assistant Examiner—K. Bradford Adolphson
Attorney, Agent, or Firm—Burd, Bartz & Gutenkauf

[57] ABSTRACT

A fish line bobber or sinker, depending upon the density of the material from which the device is made. The device comprises an elongated cylindrical or barrel-shaped body having a central longitudinal passage extending from one end to the other. A longitudinal line receiving slot extends radially from the central longitudinal opening to the outside of the body. A fish line retaining clip extends from the top of the bobber/sinker body to the bottom along the outside surface and is rotatably mounted to engage the longitudinal slot to hold the body on the line and to be rotated away from the slot to permit the body to be placed on and removed from the fish line. The outer edge of the fish line retaining clip is provided with a longitudinal groove or channel which permits the fish line to be wound in one or more longitudinal loops partially around the body to insure that the bobber/sinker body will remain firmly in place on the line.

7 Claims, 12 Drawing Figures

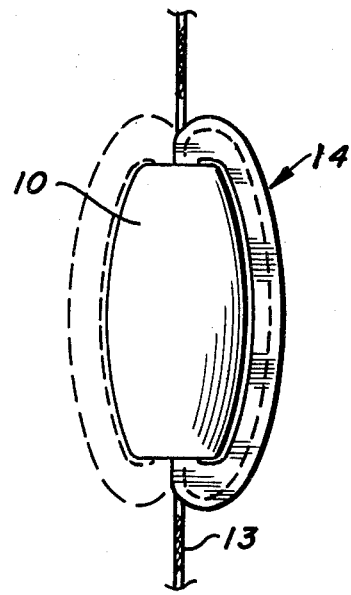
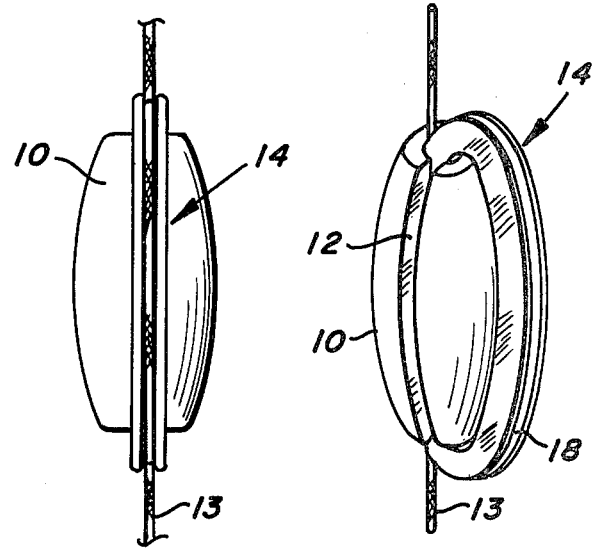
FIG. 1  FIG. 2  FIG. 3
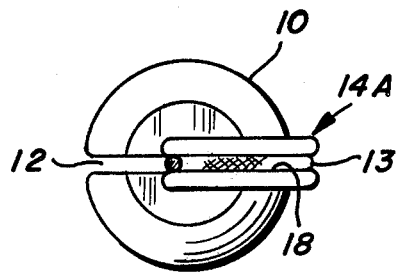
FIG. 4
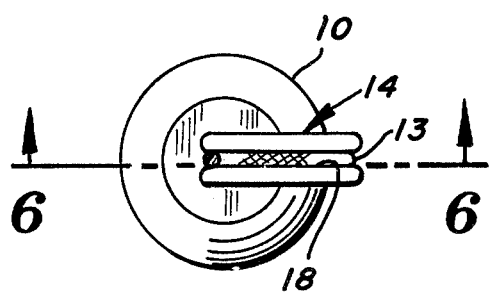
FIG. 5
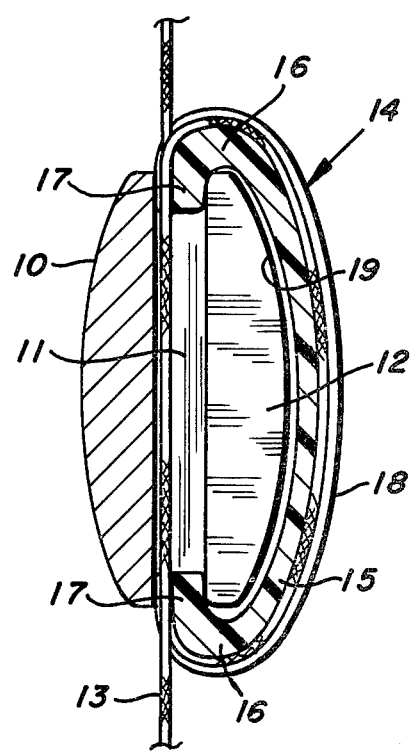
FIG. 6

FISH LINE BOBBER/SINKER

FIELD OF THE INVENTION

Background of the Invention

This invention relates to a fish line accessory. Depending upon the density of the material from which the device is made, it may function as a bobber or a sinker. A bobber is a relatively light, low-density material which functions as a float from which a length of fish line extending to a fish hook is suspended. A sinker is a relatively heavy, high-density device attached to the fish line for the purpose of sinking the fish bait toward the bottom of the body of water being fished.

THE PRIOR ART

Applicant's U.S. Pat. No. 4,235,037, issued Nov. 25, 1980, discloses a fish line sinker which may be attached to and removed from a fish line without damage to the sinker or the line and without the necessity of removing the hook or leader or artificial bait, or the like. The sinker disclosed in that patent includes a body having a central longitudinal opening and longitudinally extending slot for insertion of a fish line, and a pivotally mounted retaining clip for holding the sinker on the line.

SUMMARY OF THE INVENTION

The bobber/sinker of the present invention represents an improvement over the sinker of my aforesaid patent. Broadly stated, the fish line bobber/sinker of the present invention comprises an elongated cylindrical or barrel-shaped body having a central longitudinal passage extending from one end to the other. A longitudinal slot extends radially from the central longitudinal opening to the outside of the body. A fish line retaining clip extends from the top of the bobber/sinker body to the bottom along the outside surface and is rotatably mounted to engage the longitudinal slot to hold the body on the line and to be rotated away from the slot to permit the body to be placed on and removed from the fish line. The fish line retaining clip is provided with a longitudinal groove or channel which permits the fish line to be wound in one or more longitudinal loops partially around the body. This insures that the bobber/sinker body will remain firmly in place on the line. However, it also permits the body to be moved in one direction to a different location as desired, without the necessity of removing the body and re-installing it on the line.

BRIEF DESCRIPTION OF THE DRAWINGS

The invention is illustrated in the accompanying drawings in which corresponding parts are identified by the same numerals and in which:

FIG. 1 is a side elevation of one form of a fish line bobber/sinker according to the present invention showing the line retaining clip in either of two positions and showing the device on a fish line;

FIG. 2 is a front elevation of the bobber/sinker;

FIG. 3 is a perspective view showing the retaining clip partially rotated from the line receiving slot;

FIG. 4 is an end view showing the retaining clip in open line-receiving position;

FIG. 5 is an end view showing the retaining clip in closed line-retaining position;

FIG. 6 is a longitudinal section on the line 6—6 of FIG. 5;

DETAILED DESCRIPTION OF THE PREFERRED EMDOBIMENT

Figure 7:
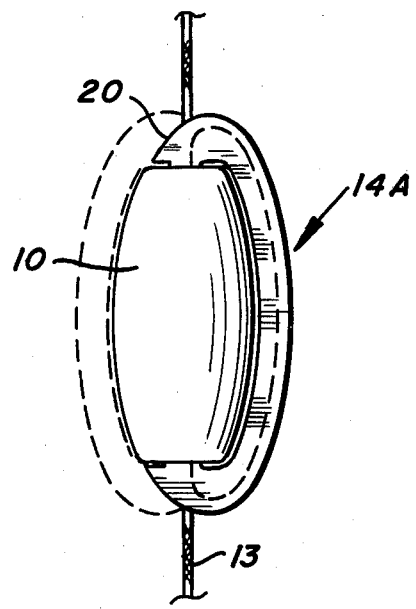
FIG. 7 is a side elevation of a second form of bobber/sinker.
Figures 8, 9:
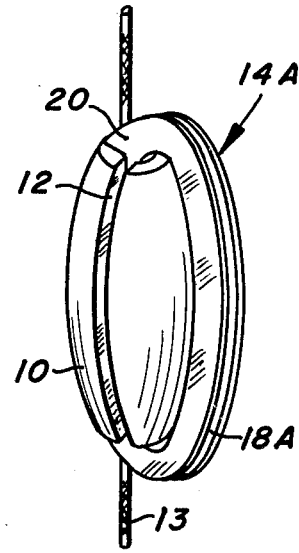
FIG. 8 is a front elevation therof.
FIG. 9 is a perspective view thereof showing the line-retaining clip partially rotated away from the entry slot.

Referring now to the drawings, and particularly FIGS. 1 through 6, the bobber/sinker includes an elongated barrel-shaped or cylindrical body 10. While shown with arcuate side walls in the vertical direction, the body 10 may also have straight side walls. The fish line device is a bobber or a sinker, depending upon the density of the body. If a bobber, the body is formed for example from low-density synthetic resinous plastic material, or the like, either solid or hollow or foamed with a substantially water impervious skin. For a sinker, the body is formed from a dense heavy material, usually lead or a lead alloy.

The body 10 is generally flattened at each end. It has a central longitudinal opening or passage 11 extending from one end to the other (FIG. 6). A longitudinal slot 12 extends radially from passage 11 to the outer wall surface of the body to permit passage of a fish line into passage 11.

A fish line retaining clip, indicated generally at 14, is rotatably mounted with respect to the bobber/sinker body 10. The retaining clip 14 comprises a longitudinally extending bow portion 15 which extends in close engagement along the outside surface of the body 10. As best seen in FIG. 6, at each end of the line retaining clip 14, the bow portion 15 is provided with a radially extending arm portion 16 in close engagement with the flat ends of the body. An inwardly extending ear 17 projects from each arm portion. The ears 17 extend into the central longitudinal passage 11 and function both to hold the line retaining clip in place and as pivot points for rotation of the retaining clip 14 about the body. The outer edge of each ear 17 has a line receiving groove or channel.

The line retaining clip engages the outer surface of the body 10 for rotation thereabout. A line receiving channel or groove 18 is provided in the outer peripheral edge of the retaining clip, a continuation of the groove or channel in the pivot ears. The function of channel or groove 17 is to permit the fish line to be wrapped in one or more loops around the retaining clip and half of the body 10. This then insures that the bobber/sinker will remain at the location on the line where it is initially placed. The channel or groove 18 should have a cross-sectional dimension sufficient to receive two or three or more loops of fish line.

The line retaining clip 14 is formed preferably from a slightly resilient synthetic resinous material, such as nylon, or the like. It must be resilient enough to permit the arms 16 and ears 17 to be distorted sufficiently to permit the ears to be snapped into place in engagement with the longitudinal passage 11. The inner surface of retaining clip bow 15 has a protruding lip 19 which snaps into slot 12 to hold the retaining clip against rotation when the retaining clip is in closed position.

In order to install the bobber/sinker on a fish line 13, the retaining clip 14 is first forceably rotated manually with respect to the body 10 to position it as shown in FIG. 4 with slot 12 and the line receiving channel in ears 17 open to receive a line. This position of the retaining clip 14 is indicated in broken lines in FIG. 1. The fish line 13 is then inserted through the slot 12 in the body and into longitudinal passage 11. Then, the fishline is looped one or two or more times around the retaining clip, resting in groove 18 thereof, and about the portion of the body 10 embraced by the retaining clip. Then the retaining clip and looped fish line is rotated 180° relative to the body to the closed position best seen in FIGS. 5 and 6. The retaining lip 19 engages the outer edge of slot 12 to hold the retaining clip against rotation.

The looped fish line around the retaining clip insures that the bobber/sinker will remain in place on the fish line at the location at which it is installed. However, it can be moved in one direction by holding the line firmly and pulling upon the bobber/sinker body. Preferably in installing the bobber/sinker on a fish line, the line is held vertically with the hook end extending downwardly from the bobber/sinker. Then, with the bobber/sinker body held vertically, after the line has been inserted in slot 12, the line is wrapped in a clockwise direction to form the loops of line in groove 17, and the retaining ring is snapped into locked position. This permits the bobber/sinker to be moved upwardly to adjust the relative distance between hook and bobber/sinker.

Figure 10:
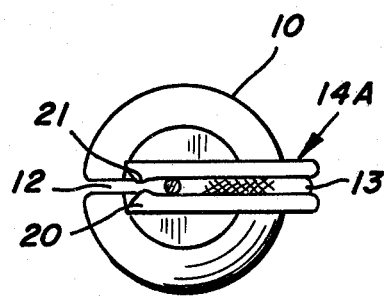
FIG. 10 is an end view showing the retaining clip in open position.
Figure 11:
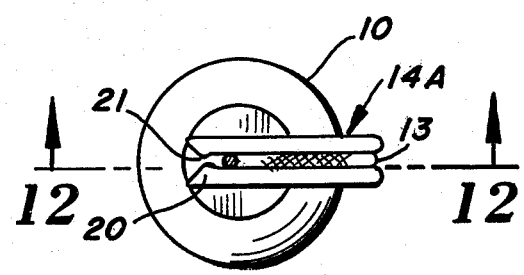
FIG. 11 is an end view showing the retaining clip in closed position.
Figure 12:
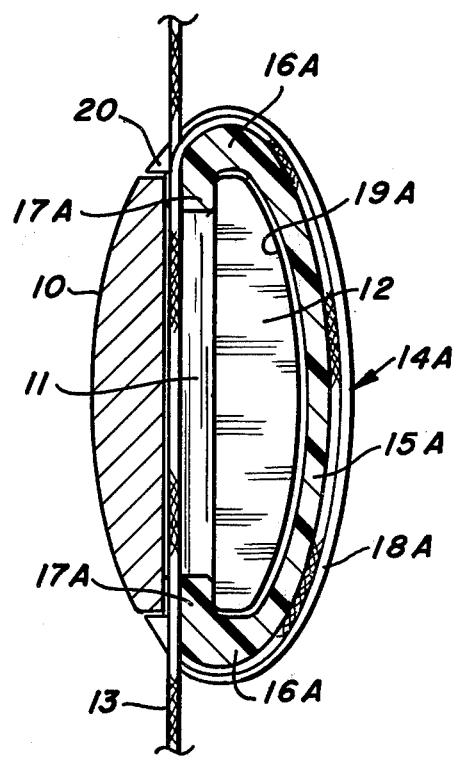
FIG. 12 is a longitudinal section on the line 12—12 of FIG. 11.

Referring now to FIGS. 7 through 12, there is shown a second embodiment of the bobber/sinker, according to the present invention. The body portion of the alternative bobber/sinker is identical to that already described in connection with FIGS. 1-6. A modified form of line retaining clip 14A is utilized. This clip includes a bow portion 15A, arm portions 16A and pivot ears 17A, as already described. It also includes an outer longitudinal channel or groove 18A for receiving a loop of fish line and locking lip 19A. In addition, the alternative form of line retaining clip 14A has a lateral extension 20 projecting across the end of the body 10 beyond pivot ears 17A from the retaining clip arm portions 16A. The lateral extension 20 comprises a pair of spaced apart fin portions (as best seen in FIGS. 10 and 11) defining a line entry channel. The lateral extension 20 may be at either end, or preferably both ends, of retaining clip 14A.

The inside surfaces of the fin elements composing lateral extension 20 are preferably shaped to provide a V entry throat for introducing the fish line into the channel between the fin elements. Preferably the inner surfaces of the fin elements are also provided with shallow projections 21 which narrow the channel passage between the fins. This forms a restricted throat such that the fish line must be forced through the restricted passage in order to gain entry. In other words, the alternative form of bobber/sinker is snapped onto the line and then accidental dislodgement of the line from the body slot is prevented. In all other respects, the use of the modified form of bobber/sinker is the same as that already described.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A fish line device comprising:
   (A) an elongated generally barrel-shaped body having a central longitudinal opening extending therethrough,
   (B) a longitudinally and radially extending slot open from the central opening to the outside of the body from one end of the central opening to the other,
   (C) a fish line retaining clip having an ear pivotally mounted with respect to each end of the body central opening and having a longitudinally extending bow integrally connected between said ears,
   (D) a fish line receiving channel outwardly positioned on each of said retaining clip ears, said fish line receiving channels extending in longitudinal alignment with the clip bow so as to be in radial alignment with the body slot and being of shape and size to receive a fish line and to position it within said sinker body central opening when said clip is aligned with said body opposite said longitudinally extending body slot, and said fish line receiving channels in said retaining clip ears being of shape and size to confine the fish line within the body central opening when the retaining clip is aligned with the body slot, and
   (E) a further longitudinally extending fish line receiving channel in the outer surface of the retaining clip bow and in communication with said ear channels, whereby the fish line may be looped around said clip and body.

2. A fish line device according to claim 1 wherein said body is composed of a light low density material, whereby said device may function as a bobber.

3. A fish line device according to claim 1 wherein said body is composed of a heavy high density material, whereby said device may function as a sinker.

4. A fish line device according to claim 1 wherein the inside surface of said clip bow is provided with a longitudinally extending projecting lip portion engageable in the outside entrance to said body slot to maintain said retaining clip in alignment with the slot, said lip portion being manually disengageable to effect rotation of said body with respect to said clip.

5. A fish line device according to claim 1 wherein said retaining clip at at least one end is provided with a lateral extension across the end of the body, said extension comprised of a pair of spaced apart fin elements defining a line receiving channel therebetween.

6. A fish line device according to claim 5 wherein the inside surfaces of the outer ends of said fin elements are flared outwardly to define a V-throat to facilitate entry of line.

7. A fish line device according to claim 6 wherein the inside surfaces of said fin elements are provided with diametrically spaced apart shallow projections to define a restricted throat spaced inwardly from said V-throat to prevent dislodgement of line from the body slot.

* * * * *